United States Patent [19]

Calvano

[11] 4,315,357
[45] Feb. 16, 1982

[54] APPARATUS FOR THE CONSTRUCTION OF FAN WHEELS OF THE DOUBLE-ASPIRATOR TYPE

[75] Inventor: Michele Calvano, Bergamo, Italy

[73] Assignee: Aertermica Nicotra S.p.A., Italy

[21] Appl. No.: 217,839

[22] Filed: Dec. 18, 1980

Related U.S. Application Data

[63] Continuation of Ser. No. 20,703, Mar. 15, 1979, abandoned.

[30] Foreign Application Priority Data

Mar. 21, 1978 [IT] Italy .............................. 21419 A/78

[51] Int. Cl.³ ...................... B23P 11/00; B23P 15/00; B23P 21/00
[52] U.S. Cl. ........................................ 29/23.5; 29/796
[58] Field of Search .............. 29/23.5, 156.8 CF, 783, 29/785, 786, 788, 796, 822

[56] References Cited

U.S. PATENT DOCUMENTS

| | | | |
|---|---|---|---|
| 2,966,788 | 8/1961 | Austin et al. | 29/23.5 |
| 3,253,318 | 5/1966 | Wentling et al. | 29/23.5 |
| 3,711,914 | 1/1973 | Baker | 29/156.8 CF |
| 3,737,966 | 6/1973 | Ranz | 29/156.8 CF |
| 3,844,682 | 10/1974 | Morris | 29/156.8 CF |

Primary Examiner—Ervin M. Combs
Attorney, Agent, or Firm—McGlew and Tuttle

[57] ABSTRACT

There is disclosed, in combination with an apparatus for the manufacture of a fan wheel having a plurality of inclined elongated blades cylindrically mounted to a pair of end rings and at least one disc centrally keyed onto the blades and carrying a fan wheel hub, a press for fixing the end rings, the disc and the blades to each other, and a blade feed conveyor belt for carrying the required number of blades, to be assembled on the fan wheel, spaced at a distance corresponding to the position of the blades when assembled on the fan wheel, and for feeding the blades to the press.

12 Claims, 8 Drawing Figures

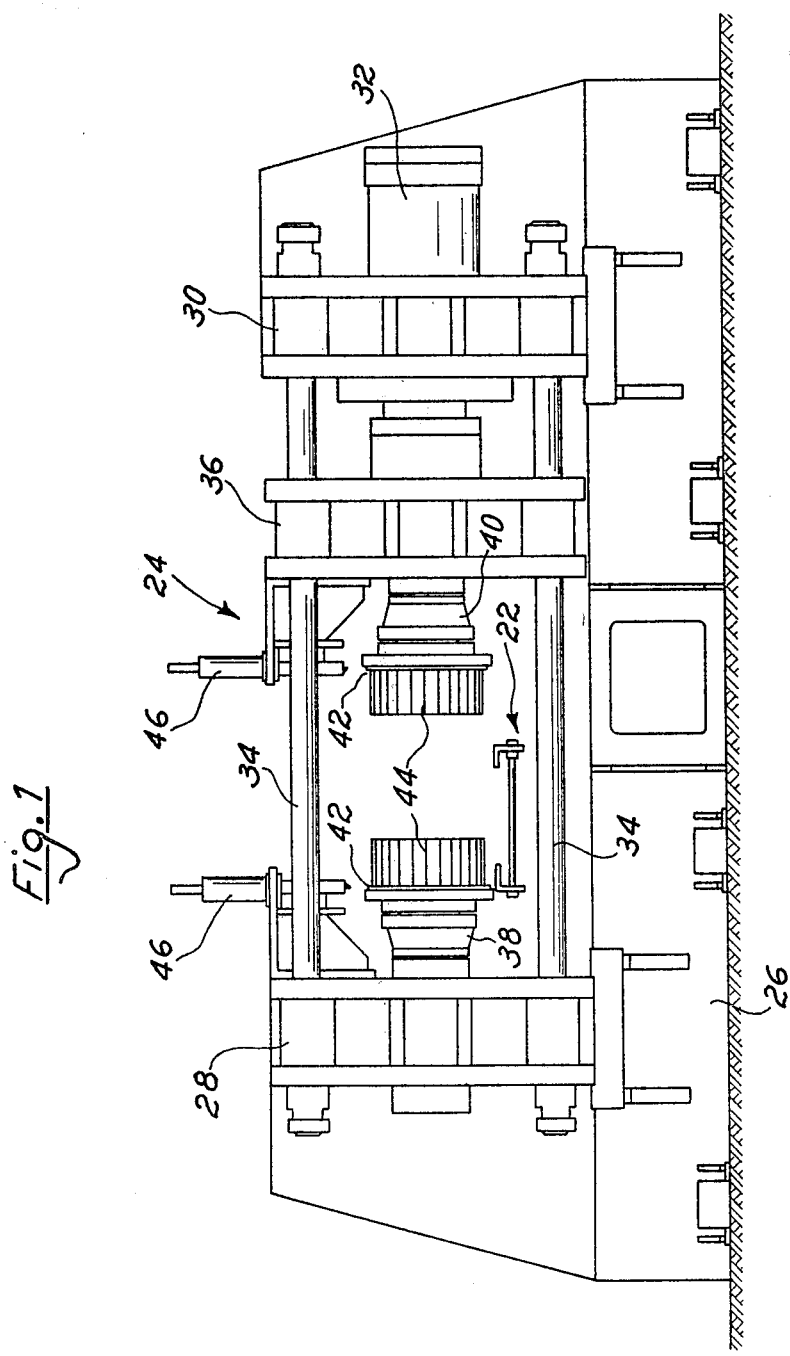

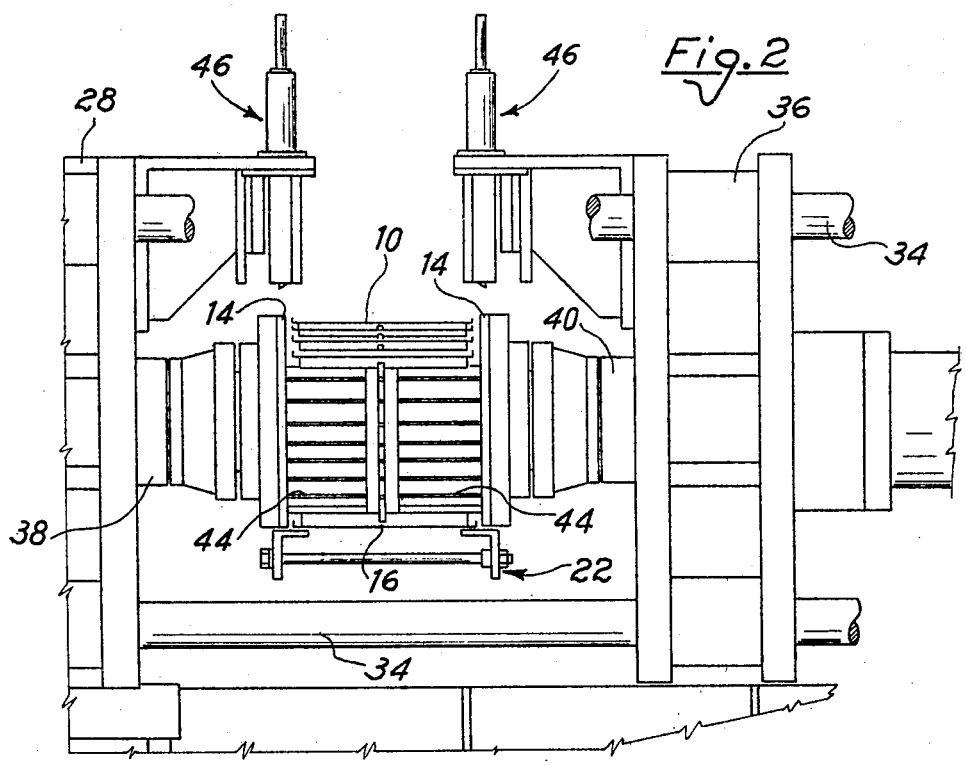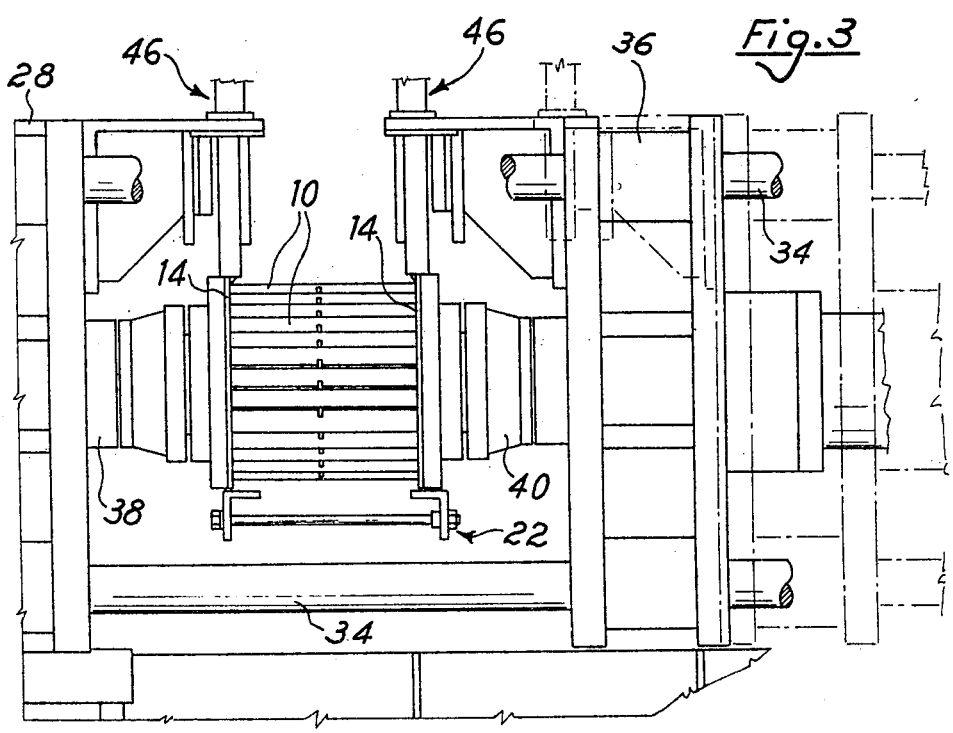

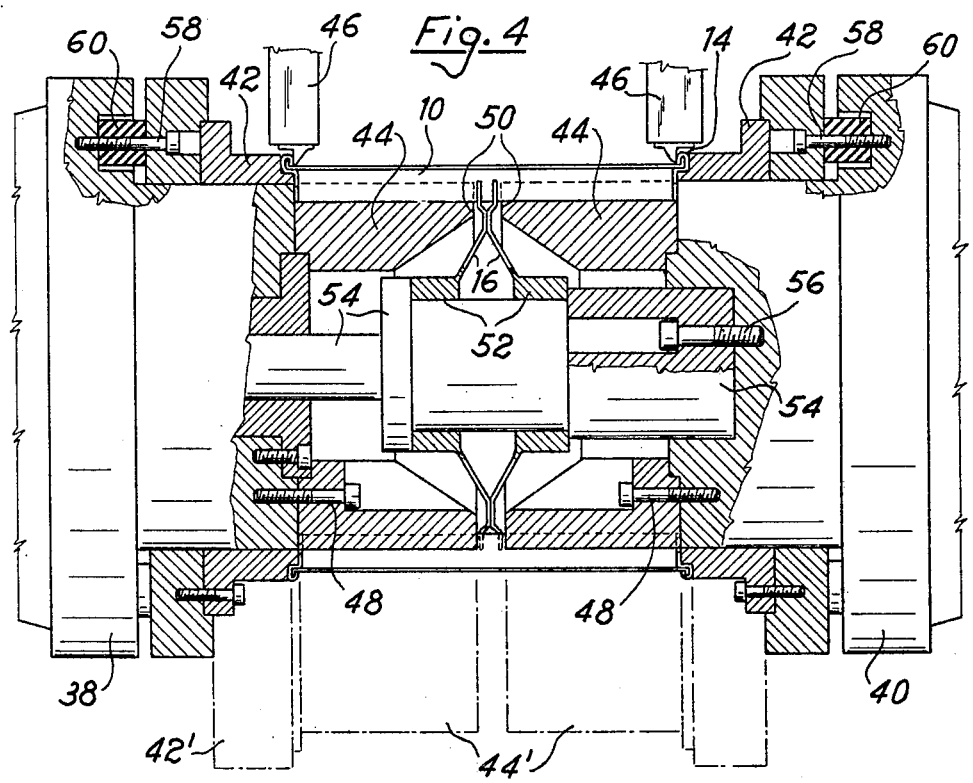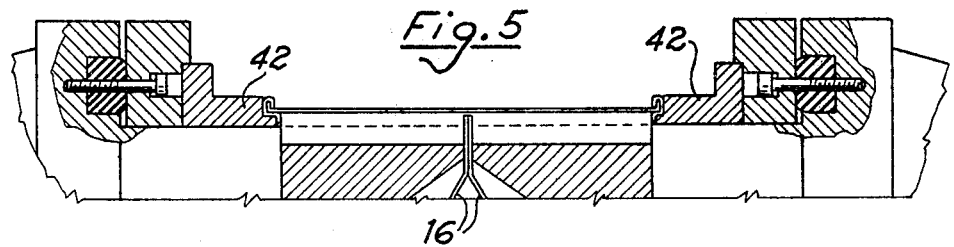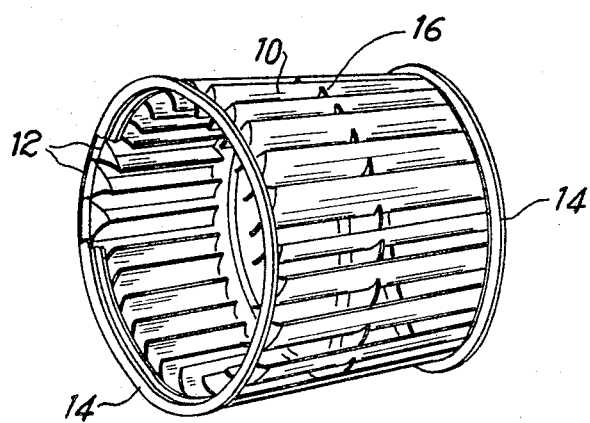

APPARATUS FOR THE CONSTRUCTION OF FAN WHEELS OF THE DOUBLE-ASPIRATOR TYPE

This is a continuation, of application Ser. No. 020,703 filed Mar. 15, 1979, abandoned.

FIELD AND BACKGROUND OF THE INVENTION

The invention relates to an apparatus for the construction of fan wheels of the double-aspirator type, consisting essentially of a plurality of inclined blades arranged on a cylindrical surface, a pair of blade restraining end rings and at least one central disk keyed to the blades and carrying the fan wheel hub.

The construction of fan wheels, at present, requires numerous manual phases which not only limit the production possibilities but also increase the costs of the finished product. Essentially, the known technique comprises the formation, by sheet blanking, of the single blades, opportunely shaped with a base or foot determining the pitch of the same, and the assembling of the formed blades on an equipment provided for detaining them temporarily in the final assembly position according to a cylindrical surface. Subsequently, two shaped rings are fixed to the end of the blades with one end bend down to be flanged to the stem of the blade so as to form a self-supporting structure from which the temporary equipment is now extracted. Finally, a central disk is inserted into the self-supporting structure. This disk is provided with notches for the blades. The notches are forced onto the said blades by means of a further pressing operation in axial direction to the periphery of the said central disk. These operations as outlined and carried out by known means, require the expenditure of much labor for assembling the blades on the equipment, the transfer of the equipment and blades to the flanging device, the extraction of the equipment, the insertion of the central disk and the transfer of the fan wheel to the device allowing the pressing and keying on of the disk.

According to the U.S. Pat. No. 2,651,830, this cycle is, in part, mechanised by using a conveyor belt carrying the blades at a prefixed distance equal to the blade pitch, with the blades then automatically loaded onto a rotating device carrying also the central disk. This solution, though ensuring a certain reduction of the required labor, still requires the transfer of the equipment with the assembled blades and the central disk to a separate flanging device; in addition, the said disk is not keyed onto the blades so that its connection with the blade structure and the terminal rings does not ensure the required stability and stiffness values.

U.S. Pat. No. 3,305,912 proposes a machine for the automatic construction of fan wheels, in which the blanked blades are fed to an equipment assembles on a mobile rotating spindle for transporting the equipment with the assembled blades to the subsequent flanging cycle. However, this machine is designed only for the making of single aspirator effect fan wheels without any problem regarding the arrangement of the central disk, the hub of the fan wheel being integral part of one of the outer rings.

This being the state of the actual art, this invention proposes an apparatus allowing to make fan wheels of the above-mentioned type requiring only a minimum use of labor or even no labor at all while, at the same time, avoiding the troublesome transfer of the fan wheels during the working phases, together with the supporting equipment for the temporary restraining of the blades in the various working stations.

SUMMARY OF THE INVENTION

These aims, and other ones which will become clear during the description given hereinafter, are realised by means of the apparatus according to this invention, essentially comprising, in combination with a feeder conveyor carrying the required number of blades at the spacing corresponding to the assembly position on the fan wheel, a press provided with two components which can be axially moved one against the other, both designed for rotating around a common axis, each component having a seat for the positioning of one of a plurality of locking rings, part of an equipment for collecting and retaining the blades coming from the conveyor belt during the rotations controlled by the said components, and, possibly, a support for the central disk or part thereof; with, in correspondence of the ring seats, there being provided a flanging device for fixing the rings to the blade stems; and still further with the said components being axially moveable one against the other, from a spaced apart ring and disk assembling position to a first closed up blade collecting position to a second position for the preparation and flanging on phase and to a third closed up position for the pressing and keying of the central disk onto the fan blades.

BRIEF DESCRIPTION OF THE DRAWINGS

This invention will be still better understood from the following description of an example thereof, but not limited thereto and on hand of the partial and schematic drawings in which:

FIG. 1 is a side view of the inventive apparatus in the fan wheel construction cycle starting position.

FIG. 2 is an enlarged partial view, similar to FIG. 1, showing some of the components of the apparatus in the blade collecting and positioning phase.

FIG. 3 is a view similar to FIG. 2 showing the subsequent terminal fan wheel ring flanging phase.

FIG. 4 shows an enlarged detail, partly in section, of some of the components of the apparatus during the cycle illustrated in FIG. 3.

FIG. 5 is a partial section corresponding to FIG. 4 illustrating the subsequent central disk pressing and keying on phase.

FIG. 6 is a perspective view of the overall structure of a fan wheel made according to the described apparatus.

DETAILED DESCRIPTION OF PREFERRED EMBODIMENT

Figure 7:
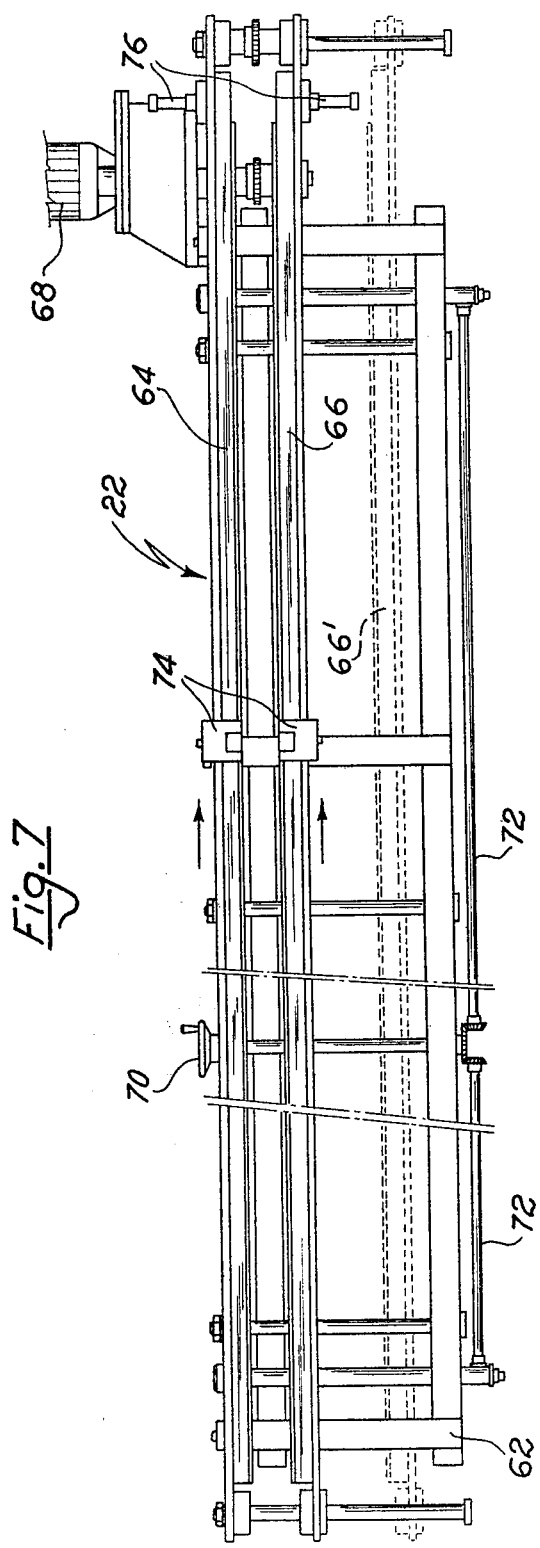
FIG. 7 is a plan view of the blade conveyor.

Referring now, first of all, to FIG. 6, the fan wheel of the double aspirator type, to be constructed, consists essentially of a plurality of blades 10 shaped as required, having at their axial end bases or feet in contact with another for determining the desired pitch between the blades 10. These blades, together with their feet 12, are made according to known methods by sheet blanking. The structure formed by the group of blades 10, of the prefixed number and arranged to form a cylindrical surface, is made self-supporting by means of a pair of outer rings 14 each of which being approximately U- shaped so as to receive the blade bases or feet 12, with one side of the said U being bent over the feet 12 to restrain the latter. The fan wheel is then completed by an inner disk or disks 16 facing one the other carrying the hub of the fan wheel and with the peripheral edge provided with notches 18, whose opening is obtained by the axial deformation of the said peripheral edge as shown at 20 in FIG. 8. The blades 10 are inserted into the said notches 18, followed by the compression of the peripheral edge of each disk 16 in direction of the arrows x, FIG. 8, for ensuring the forced and stable connection of each disk 16 with the blades 10, that is with the fan wheel structure as such. For the construction of fan wheels of the illustrated type an apparatus is proposed whose components are illustrated in FIG. 1. Essentially, this apparatus consists of a conveyor belt 22, functioning in combination with a particular type of press, preferably a horizontal press 24. According to FIG. 1, this press comprises a base 26 supporting a structure essentially formed of two vertically arranged fixed cross-pieces 28 and 30, with the second cross-piece supporting an oilhydraulic cylinder 32 controlling the axial movements of the said press.

The cross-pieces 28 and 30 are connected by horizontal columns 34 carrying, in horizontally sliding relationship, a slide 36 driven by the cylinder 32. Both the cross-piece 28 and the slide 36 carry two substantially symmetric components 38 and 40, which can be axially displaced one against the other under the action of the cylinder 32 and which can also be rotated around their own common axis by means of a control device of a conventional type, with the rotation of the said two components 38 and 40 being supposed to be rigorously congruent.

To the said components 38 and 40 are fixed, preferably in a manner allowing their replacement for adaption to fan wheels of different geometric forms, the equipments and components necessary for the carrying out of the different operations required for making the fan wheel, the said equipment and operations now being described more in detail with reference to the different operation phases. The components 38 and 40 are provided each with a seat for the temporary receiving and retaining, for example by means of magnet or similar device, one terminal ring inserted by the operator at the beginning of the cycle. This seat is schematically indicated with 42 in FIG. 1. In addition, the said components 38 and 40 carry each one half of an equipment 44, designed collecting and temporary retaining the blades, for example by means of electric or magnetic systems, each of the said semi-equipments 44 being of a type already known, for example with hubs retaining the blades of the type already described in the U.S. Pat. No. 2,651,830. Finally, at least one of the components 38 and 40 is fitted with a means for retaining the central disk or disks, also assembled in advance by the operator, in such a way that its notches 18 are aligned with those of the semi-equipment 44.

At the position of the seats 42 for the terminal rings, the cross-piece 28 and the slide 36 are fitted with flanging devices 46, consisting, for example, of arms carrying flanging rollers which can be lowered onto the end rings under the action of one or more oilhydraulic cylinders.

The shown press cooperates, as already mentioned, with a conveyor belt 22 of variable length which can be adjusted according to the size of the blades to be transported and which is arranged with its downstream end near the two semi-equipments 44 so as to feed the blades to the latter.

When it is intended to construct a given type of fanwheel, the apparatus is therefore prepared by presetting the width and height of the belt 22 and assembling the seats 42, semi-equipments 44 and supports for the central disks of the size corresponding to the geometrical details of the fan wheel. In addition, as will be explained more in detail hereinbelow, the successive feed steps of the component 40 operated by the cylinder 32, are determined by suitable limit switches. At the beginning of each fan wheel construction cycle, an operator positions with the apparatus in the conditions shown in FIG. 1, the end rings and the central disk or disks of the fan wheel.

Subsequently, the fan wheel construction cycle is started with the component 40 advancing a first step in direction of the components 38 until reaching a first approached position. In the first position, the semi-equipments 44 are almost in contact above the conveyor belt 22 and the end rings 14 are seated on to the seats 42. The result of the movement to the first position is that the outer portion of semi-equipments 44 are intersected by the blades which are supplied by means of the belt 22. On this belt, the blades are so arranged that their feet are located in a position corresponding to their assembled location on the finished fan wheel.

Under these conditions, when the belt feed speed 22, the congruent rotation of the two components 38 and 40 correspond to that of the peripheral speed of the semi-equipments 44, the blades are automatically collected from the belt and retained by the equipment 44 and the notches 18 of the disk or disks, using for this purpose for example elastic or magnetic systems.

The blades supplied during each phase of the conveyor belt are previously counted so as to correspond to the number of blades required by the fan wheel and avoid the danger of unexpected interferences at the end of the collection phase.

After all the blades have been collected and positioned as shown in FIG. 2, the cylinder 32 makes a second, limited forward movement allowing the insertion of the U-shaped end rings, positioned in precedence, onto the feet of the blades, followed, as shown in FIG. 3, by the lowering of the flanging device 46, with a further rotation, possibly at a higher speed, ensuring the flanging operation.

FIG. 4 illustrates the main parts of the equipment after the flanging phase, these parts being shown in cross-section along a plane passing through the common axis of the components 38 and 40. As shown in FIG. 4, the two semi-equipments 44 are integrally fixed to the components 38 and 40, for example with screws 48, thus permitting their replacement with parts of a different size, for example, like those indicated at 44' by means of dotted line. These equipments 44 carry, in addition to the temporary housing and blade retaining means, pressing surfaces 50, opposed one to the other on the two semi-equipments 44 and destined for acting onto a peripheral part of the central disk or disks 16 assembled before each cycle on the opposite ends of the semi-equipments 44. More precisely, the hub 52 of the central disks 16 is retained, for example by magnetic means, on suitably shaped elements 54 which as fixed in a removable manner to the components 38, 40, for example, with screws 56, with at least one of the elements 54 being elastically mounted to allow the approach of the components 38 and 40 of the press with out the generation of compression stresses onto the said hub parts. In any case, in the flanging position shown in FIG. 4, the two ends of the semi-equipments 44 are still spaced apart and the central disk 16 is not subjected to compression stresses.

The components 38 and 40 of the press also carry the seats 42 for the fan wheel end rings 14. The seats 42 are formed of shaped rings assembled on the components 38 and 40 by means of screws 58 with interposed elastic elements 60, for example in the form of rubber blocks, providing a certain axial sliding of the seats 42 on the components 38 and 40 during the last operation phase.

Figure 8:
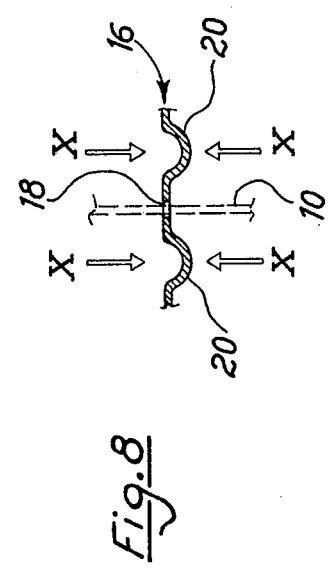
FIG. 8 is a partial cross-section illustrating the conformation of the central disk or disk before being pressed and keyed to the wheel.

This last phase is partially illustrated in FIG. 5 and comprises a third forward feed of the cylinder 32 approaching still further the semi-equipments 44 so that their surfaces 50 exert a certain pressure upon the peripheral edge of the central disk or disks 16, flattening the said edge and keying the disk or disks onto the blades by means of an action already described with reference to FIG. 8. During this pressing and keying movement, the more central part of the disks 16 not stressed for the reasons already given hereinbefore and the pressing action is not communicated to the blades thanks to the presence of the elastic buffers 60 consenting the corresponding sliding of the seats 42 on the components 38 and 40.

After the completion of this phase the press is again opened and returns into the position of FIG. 1, in which the finished fan wheel can be removed from one of the semi-equipments 44 and sent to stores. In this position of the press the operator then assembles the end rings and the central disk or disks for the starting of a new cycle.

FIG. 7 shows a top view of a possible design of the conveyor belt 22 supplying the blades to the semi-equipments 44.

This conveyor belt consists essentially of a carrying structure 62 of a suitable length for supporting two endless conveyor belts 64 and 66, parallel and adjacent to another, both moved by a common motor 68. The belt 66 is adjustable in parallel to itself for adapting it to blades of different axial dimensions by means of a handwheel 70 and geared transmissions 72 consenting its adjustment within the limit positions 66 and 66' illustrated in the figure.

A retaining and counting device 74 positioned at the downstream end of the belt, counts a given number of blades corresponding to that required for completing a fan wheel, stopping the next blades which, due to the forward movement of the belts 64, 66, are accumulated against the device. A second stopping device 76 is provided just before the downstream end of the belt and detains the blades against the movement of the belt, completing if required the accumulation when in contact with the blades before the beginning of the loading phase loading the blades onto the equipment. It is understood that the conveyor belt 22 can be adjusted in height at least at its downstream end to adapt it to fan wheels of different sizes.

The blades can be charged onto the belt by an operator or directly by automatic means when coming from the cutter blanking the blades and are constantly fed until coming to a stop against the stop 74. The latter is opened at each cycle to allow the passing of a desired number of blades which move forward until stopped by a second stop 76 until the opening of the latter at the beginning of the blade loading phase. At the end of this phase, the stop 76 is closed allowing at the same time the opening of the stop 74 for inserting the blades required for the subsequent fan wheel assembling cycle. The above-given description clearly shows that the illustrated apparatus allows the construction of double aspirator fan wheel with the sole manual work required being that relating, at the start of each cycle, to the arrangement of the end rings 14 and central rings 16 and the removal of the finished fan wheel from the equipment 44.

It is obvious, from the description of the embodiment here shown, that it is possible to apply numerous variants which will be evident to the experts of this branch, without leaving the limits and the domain of the here called-for letters and industrial patent.

What We claim Is:

1. In combination with an apparatus for the manufacture of a fan wheel having a plurality of inclined elongated blades cylindrically mounted to a pair of end rings and at least one disk centrally keyed onto the blades and carrying a fan wheel hub, a press for fixing the end rings, the disk and the blades to each other, and a blade feed conveyor belt for carrying the required number of blades, to be assembled on the fan wheel, spaced at a distance corresponding to the position of the blades when assembled on the fan wheel, and for feeding the blades to the press, the improved press comprising two horizontally spaced components, each component being displaceable one toward the other and concurrently rotatable about a common axis, each component having a seat surface for carrying one of the end rings, each component having means for collecting and retaining the blades coming from the conveyor belt and for pressing and keying the central disk to the blades, means for flanging the end rings directly onto the ends of the blades, said components being displaceable one toward the other between an initial position and a final position through successive positions including:
(a) a first position, above the conveyor belt, to successively rotatably collect the blades onto the components in response to rotation of the components, (b) a second position to insert the end rings onto opposite ends of the blades and to rotatably flange the rings onto said ends of the blades during continuous rotation of said components, and (c) a third position in engagement with the central disk to press and key the central disk to the blades.

2. The apparatus as set forth in claim 1, wherein each of said seat surface, said collecting and retaining means, and said pressing and keying means is removably mounted to said components.

3. The apparatus as set forth in claim 1, wherein said pressing and keying means comprises opposed means operative to act only on the peripheral crown of the disc.

4. The apparatus as set forth in claim 1, further comprising means for elastically supporting said seat surface whereby said seat surface is fixably positioned during a part of the axial displacement of said components one against the other.

5. The apparatus as set forth in claim 1, wherein one of said components is axially fixed, and further comprising fixed guide means for slidably carrying the other of said components for axial displacement relative to said fixed component, and means for driving said axially displaceable component.

6. The apparatus as set forth in claim 1, wherein said components are operative to rotate at a predetermined peripheral speed, and the feed conveying belt is operative to carry the blades at a predetermined belt speed, and the peripheral speed equals the belt speed.

7. The apparatus as set forth in claim 6, wherein the conveyor belt comprises a pair of parallel belts having an adjustable spacing for adapting them to the length of the blades to be carried.

8. The apparatus as set forth in claim 1, wherein said components are axially displaceable one against the other in successive unidirectional movements as a function of the specific equipment mounted on the components and the dimensions of the fan wheel to be made.

9. The apparatus as set forth in claim 1, wherein each of said feed surface, said collecting and retaining means, and said pressing and keying means is removably mounted to said components, said pressing and keying means comprising opposed means operative to act only on the peripheral crown of the disc, and further comprising means for elastically supporting said seat surface, whereby said seat surface is fixably positioned during a part of the axial displacement of said components one against the other.

10. The apparatus as set forth in claim 9, wherein said components are axially diplaceable one against the other in successive unidirectional movement as a function of the dimensions of the fan wheel to be made.

11. The apparatus as set forth in claim 10, wherein one of said components is axially fixed, and further comprising fixed guide means for slidably carrying the other of said components for axial displacement relative to said fixed component, and means for driving said axial displaceable component.

12. The apparatus as set forth in claim 11, wherein said components are operative to rotate at a predetermined peripheral speed, and the feed conveyor belt is operative to carry the blades at a predetermined belt speed, and the peripheral speed equals the belt speed.

* * * * *